United States Patent [19]

Tucek

[11] 4,254,807
[45] Mar. 10, 1981

[54] TREE HARVESTING APPARATUS AND METHOD

[75] Inventor: Frank J. Tucek, Wausau, Wis.
[73] Assignee: J. I. Case Company, Racine, Wis.
[21] Appl. No.: 928,813
[22] Filed: Jul. 28, 1978
[51] Int. Cl.³ .............................................. A01G 23/08
[52] U.S. Cl. ................................ 144/34 E; 144/3 D; 298/17.6
[58] Field of Search ................. 298/17.5, 17.6, 18; 144/3 D, 34 R, 34 E, 309 AC

[56] References Cited

U.S. PATENT DOCUMENTS

| | | | |
|---|---|---|---|
| 1,071,265 | 8/1913 | Schlatter | 298/17.6 |
| 2,214,334 | 9/1940 | Knight, Jr. | 144/34 E |
| 2,529,934 | 11/1950 | Gracey et al. | 144/34 E |
| 2,565,252 | 8/1951 | McFaull | 144/34 E |
| 3,122,184 | 2/1964 | Larson | 144/34 E |
| 3,227,745 | 6/1965 | Meece et al. | 144/34 E |
| 3,277,936 | 10/1966 | Larson | 144/34 E |
| 3,468,352 | 9/1969 | Larson et al. | 144/3 D |
| 3,627,004 | 12/1971 | Ramey | 144/34 E |
| 3,785,415 | 1/1974 | Taponen | 144/34 R |
| 3,995,671 | 12/1976 | Wirt | 144/3 D |
| 4,044,804 | 8/1977 | Dodd | 144/34 E |
| 4,050,488 | 9/1977 | Albright | 144/34 E |
| 4,127,154 | 11/1978 | Kabotoff | 144/3 D |

FOREIGN PATENT DOCUMENTS

| | | | |
|---|---|---|---|
| 940449 | 2/1956 | Fed. Rep. of Germany | 298/17.6 |
| 1120170 | 4/1902 | France | 298/17.6 |
| 141698 | 2/1961 | U.S.S.R. | 144/3 D |
| 466010 | 5/1973 | U.S.S.R. | 144/3 D |
| 385559 | 8/1973 | U.S.S.R. | 144/3 D |

*Primary Examiner*—W. Donald Bray
*Attorney, Agent, or Firm*—Dressler, Goldsmith, Shore, Sutker & Milnamow, Ltd.

[57] ABSTRACT

A tree harvesting apparatus includes a vehicle driven by an engine with first and second arm members pivotally supported on the vehicle and normally biased to a first position defining an open pocket for receiving a standing tree. Cutter means associated with the arm members sever the standing tree as the vehicle is being moved along the ground. The tree harvesting apparatus also has an accumulator means for accumulating the severed trees which in one embodiment includes a pair of cradles pivoted on the vehicle frame so that the trees can be dumped to either side of the vehicle.

9 Claims, 13 Drawing Figures

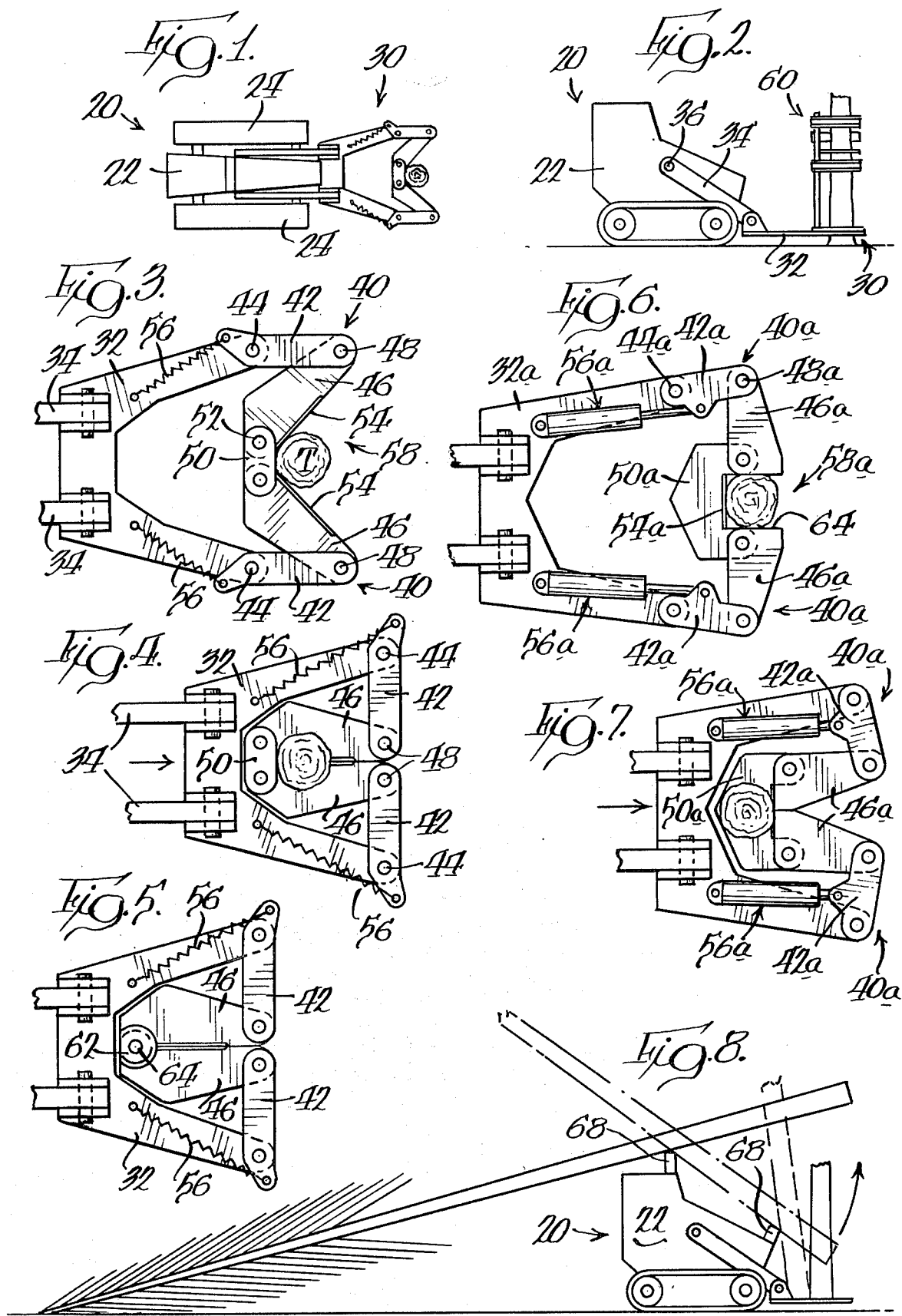

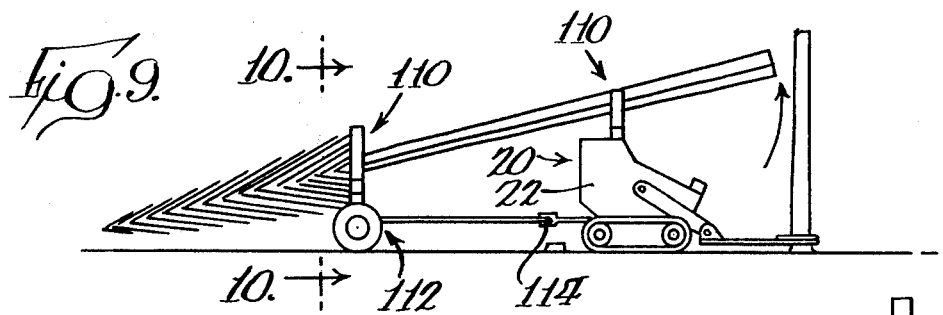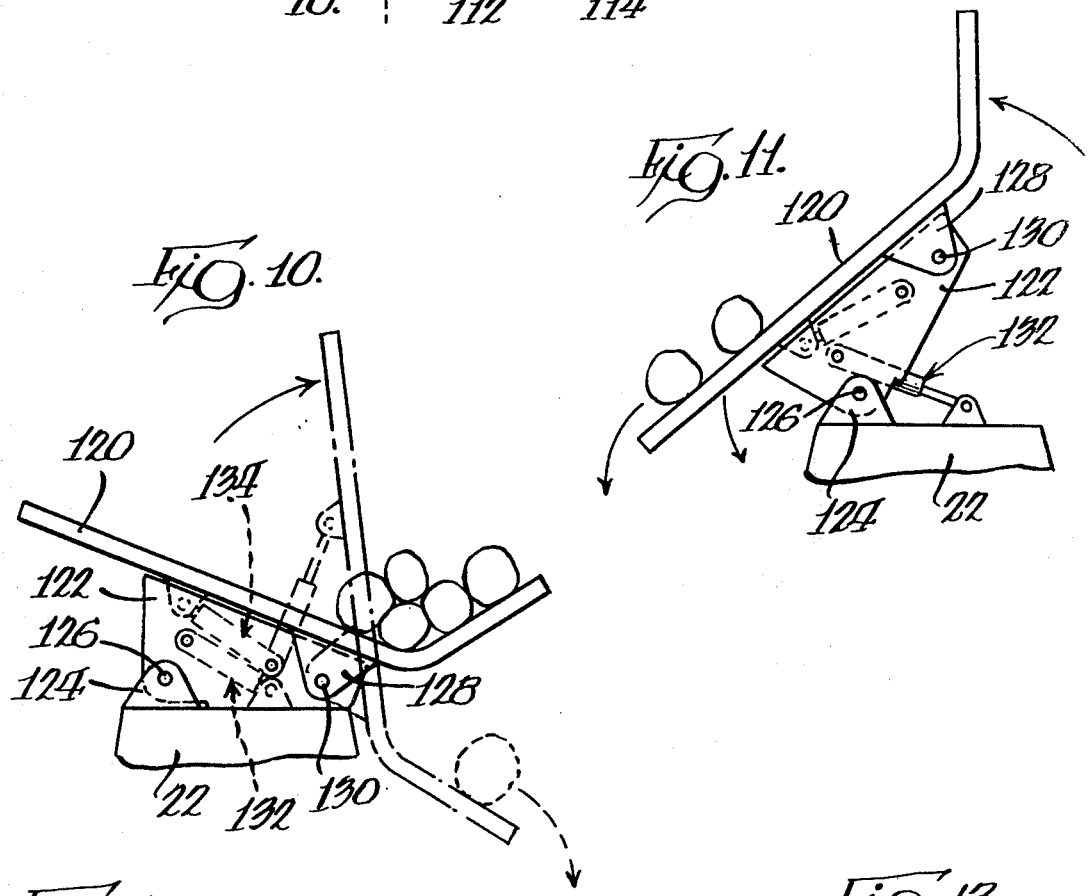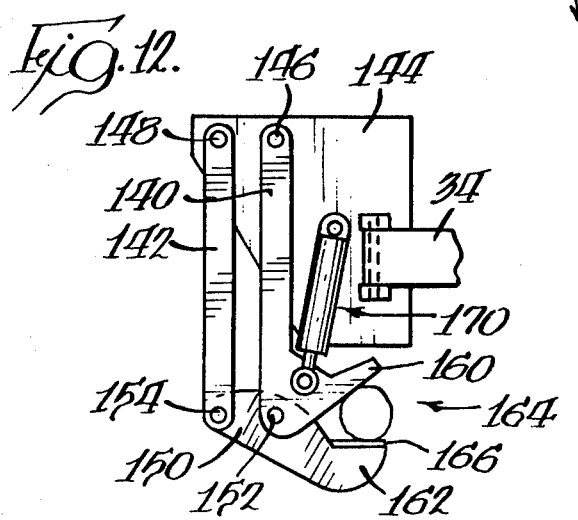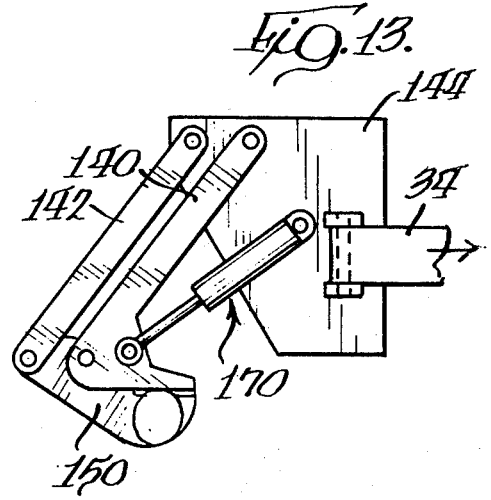

TREE HARVESTING APPARATUS AND METHOD

BACKGROUND OF THE INVENTION

The present invention relates generally to tree harvesting apparatus of the type that is utilized for severing a large tree at the base.

Because of the increased cost of manual labor and other economic factors, a considerable amount of attention has recently been devoted towards development of various types of mechanical tree harvesting apparatus to replace the conventional manual chain saw. One such type of mechanized tree harvesting apparatus that has found a remarkable degree of commercial success is the type disclosed in U.S. Pat. No. 3,575,222, assigned to the assignee of the present invention.

Quite recently considerable emphasis has also been placed upon increasing the productivity of mechanized tree harvesting apparatus by providing some type of accumulator mechanism for receiving the harvested trees so that a plurality of trees can be gathered before they are deposited on the ground in a group or placed on a vehicle for subsequent transportation. In this connection, one type of accumulator apparatus is disclosed in Tucek U.S. Pat. No. 3,910,326. This patent discloses a tree harvesting head which is adapted to be attached to the end of a boom with mechanism for accumulating a plurality of trees on the harvesting head before it is necessary to dump the trees.

While the harvesting apparatus disclosed in the above-mentioned patents have found a remarkable degree of commercial success, competitors are constantly striving for increasing the productivity of a mechanized harvesting mechanism, preferably at a reduced cost.

SUMMARY OF THE INVENTION

According to the present invention, a tree harvesting apparatus is designed such that the trees may be severed while the vehicle supporting the cutting mechanism remains in motion thereby increasing the productivity of such a unit.

More specifically, the method aspect of the present invention contemplates supporting a cutter mechanism in a normally open position on one end of the frame of a vehicle that is driven by propulsion means so that the cutter mechanism defines an open pocket for receiving a tree to be cut. The cutter mechanism is pivotally supported on the vehicle in such a manner that the vehicle can be advanced towards a standing tree which is received into the pocket and which is severed through continued motion of the vehicle in the same direction.

The apparatus of the present invention consists of the vehicle having a frame which is moved along the ground by propulsion means and has first and second arm means respectively pivoted thereon between first and second positions. The arms are normally held in a first position which defines an open pocket for receiving a standing tree with cutter means on the arms within the pocket for severing the standing tree so that further movement of the vehicle towards a standing tree will cause the arms to pivot from the first open position to a second closed position to sever the tree at the base thereof.

In one embodiment of the invention, each arm includes a pair of pivotally interconnected rigid members with one of the members for each arm being pivoted on the frame and the opposite ends of the second members are interconnected by a link with cutter blades associated with the second members. In a second version of the invention, the cutter blade is attached to the link adjacent the open pocket and the second rigid members are designed so that the tree is forced towards the cutter blade. In a further modified form of the invention, one of the arm members cooperates with the inter-connecting link to define the open pocket and relative pivotal movement of the arm members and the link on the vehicle will sever the tree.

In all versions of the invention, the cutter apparatus also includes means for normally maintaining the arms in an open position and accommodating pivotal movement to a closed or second position. In one version of the invention, this is accomplished with springs which normally hold the arms in an open or first position while in another version of the invention, this is accomplished with power assist means in the form of hydraulic fluid rams which aid in moving the arms to the closed position to assist in severing the tree.

According to another aspect of the invention, the vehicle also includes accumulator means which is capable of accumulating and dumping the severed trees while the vehicle is in motion. The accumulator means consists of first and second spaced cradles that are pivotally supported on the frame and can be pivoted to either side of the vehicle to dump the trees on either side while the vehicle is in motion.

BRIEF DESCRIPTION OF THE SEVERAL VIEWS OF THE DRAWINGS

FIG. 1 is a plan view of a vehicle having a cutter mechanism supported thereon;

FIG. 2 is a side elevation view of the cutter mechanism with an accumulator mechanism associated therewith;

FIG. 3 is an enlarged plan view of the cutter mechanism shown in FIG. 1;

FIG. 4 is a view similar to FIG. 3 showing the cutter mechanism in a closed or second position after a tree has been severed;

FIG. 5 is a view similar to FIG. 4 showing a slightly modified form of the invention;

FIG. 6 is a view similar to FIG. 3 showing a further modified form of cutting apparatus;

FIG. 7 is a view similar to FIG. 6 showing the cutting mechanism in a second closed position;

FIG. 8 is a side elevation view of the vehicle showing the manner of directing the tree after it has been severed;

FIG. 9 is a side elevation view of the tree harvesting apparatus with a modified form of accumulator means associated therewith;

FIG. 10 is a fragmentary end view of a portion of the accumulator mechanism;

FIG. 11 is a view similar to FIG. 10;

FIG. 12 is a further modified form of cutter mechanism supported on a vehicle; and FIG. 13 is a view similar to FIG. 12 showing the cutter mechanism in a closed position.

DETAILED DESCRIPTION OF THE PREFERRED EMBODIMENT

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

FIG. 1 of the drawings discloses a vehicle generally designated by reference numeral 20 which includes a vehicle body or frame 22 supported by ground engaging members 24 and propelled by propulsion means, such as an engine (not shown). Preferably, the ground engaging means 24 are in the form of endless tracks to provide better traction for the vehicle. Vehicle 20 includes a cutter mechanism 30 supported at the forward end thereof. Cutter mechanism 30 consists of a subframe 32 mounted on the outer ends of a pair of lift arms 34 which are pivotally supported on the vehicle frame by pivot pins 36. The lift arms may be raised and lowered with respect to vehicle frame 22 through suitable hydraulic fluid rams (not shown). Likewise, if desired, the subframe 32 could also be pivotally supported on the outer end of lift arms 34 and pivoted thereon through further fluid rams (not shown).

Cutter mechanism 30 includes first and second arm means 40 which are substantially identical in construction and only one will be described. Each arm means consists of a first rigid member or link 42 pivoted by a pin 44 on the outer end of a leg of the substantially U-shaped subframe 32. Arm means 40 includes a second rigid member or link 46 which has one end pivoted on a free end of link 42 through a pivot pin 48. The opposite ends of rigid members or links 46 are interconnected through a further link 50 that has opposite ends pivotally connected to the free end of the respective rigid members or links 46 through pins 52. Rigid members or links 46 each have a cutter blade 54 fixedly secured thereto through suitable means (not shown).

Arm means 40 are normally held in a first position through suitable biasing means in the form of springs 56 that have one end connected to subframe 32 and the opposite end connected to link 42 at a location spaced from pivot pin 44. Biasing means 56 normally maintain the first and second arm means 40 in the position illustrated in FIG. 3 wherein the arm means and links cooperate to define an open pocket 58 for receiving a standing tree T.

With the apparatus so far described, vehicle 20 is manipulated towards a tree and the tree is aligned with the center of the open pocket 58 in the position illustrated in FIGS. 1 and 3. Once the tree is positioned as illustrated in FIG. 3, continued advancement of vehicle 20 towards the standing tree T will cause first and second arm means 40 to pivot from the position illustrated in FIG. 3 to the position illustrated in FIG. 4 to sever the tree at its base. After the tree has been severed, biasing springs 56 will automatically move the respective arm means 40 to the first position illustrated in FIG. 3 wherein the cutting apparatus is ready and in position for severing a subsequent tree. Thus, it will be appreciated that the productivity of a unit of this type will be substantially increased since, with appropriate training, an operator can sever a plurality of trees without interrupting the forward movement of the vehicle.

If desired, a suitable accumulating mechanism 60 may be associated with the cutting apparatus and the accumulating mechanism may take a variety of forms. One type of accumulator mechanism 60 that can be utilized with the tree harvesting apparatus as discussed above is disclosed in Tucek U.S. Pat. No. 3,910,326, the portions which are consistent with this disclosure being incorporated herein by reference. Other types of accumulating mechanisms will be discussed below.

A slightly modified form of the invention is illustrated in FIG. 5 wherein the parts corresponding to the parts in FIG. 4 have been repeated. In the embodiment illustrated in FIG. 5, link 50 which defines the interconnection between the free ends of arm members 46 is eliminated and rather a pair of ears 62 integral with one end of one arm member 46 and a single ear integral with the other arm that are in overlapping position and are interconnected by a pin 64. In all other aspects, the embodiment illustrated in FIG. 5 is identical to that illustrated in FIG. 4 so a complete description does not appear to be necessary.

FIGS. 6 and 7 illustrate a further slightly modified form of the invention. In this embodiment many of the parts of the cutter apparatus are very similar to the embodiment described in connection with FIGS. 3 and 4. The cutter mechanism again consists of a sub-frame 32a which has first and second arm means 40a pivoted on the legs of the U-shaped frame. Each arm means consists of a first rigid member 42a pivoted through pivot pin 44a on subframe 32a with a second rigid member or link 46a pivoted on the outer end of the first member through pivot pin 48a. In the embodiment illustrated in FIGS. 6 and 7, link 50a has a cutter blade 54a associated therewith and is preferably fixedly secured thereto. Second rigid members 46a each have an abutment surface 64 associated therewith and aligned with the tree receiving pocket 58a. When a tree has been aligned with and is located within pocket 58a, continued forward advancement of the vehicle will cause first and second arm members 40a to pivot from the position illustrated in FIG. 6 to that illustrated in FIG. 7 and the arrangement of the linkage is such that the abutment surfaces will force the tree through the cutter blade 54a.

In the embodiment illustrated in FIGS. 6 and 7, springs 56 are replaced with a power assist means in the form of first and second fluid ram means 56a which are respectively interposed between the subframe 32a and rigid arm members 42a. Of course, extension of fluid rams 62a to the position illustrated in FIG. 6 will move first and second arm means 40a to a first position defining an open tree receiving pocket 58a. Fluid rams 56a can also be utilized as a power assist means for the propulsion means to provide additional force for severing the tree by proper control of pressurized hydraulic fluid to opposite ends of the fluid rams 56a. Arm means 40a may also be retained in any position intermediate the two positions illustrated in FIGS. 6 and 7. For example, if the trees that are being severed are substantially smaller than the maximum diameter tree capable of being severed by the cutting mechanisms, the links could be moved to an intermediate open position to reduce the amount of travel required to move the links from the open to the closed positions.

Again, it is desirable to have some type of accumulator mechanism for accumulating small trees into a cluster before they are deposited on the ground. Alternatively, vehicle 20 could have mechanism associated therewith for guiding and collecting the severed trees as illustrated in FIG. 8. In this form of the invention, vehicle frame 22 has first and second abutments in the form of cradles 68 which are fixedly secured to the frame at desired locations in alignment with the tree receiving pocket 58a or 58. In this version of the invention, as the tree is finally severed the forces resulting from the moving vehicle will cause the tree to fall rearward. However, as the tree is being finally severed, the lift arms 34 could be raised slightly to insure that the extremely large tree would tilt rearwardly with respect to the path of movement of vehicle 20. The cradles 68 would then act as guides and fulcrum points for causing the tree to tip rearwardly towards the area directly behind the vehicle and the upper fulcrum point would ultimately act as a guide for allowing the tree to slide therealong and ultimately be deposited on the ground.

A further modified form of accumulator mechanism is illustrated in FIGS. 9, 10 and 11 which can be utilized with any of the cutter mechanisms described above and to be described later. The novel accumulator mechanism illustrated in FIGS. 9-11 consist of first and second cradles 110 which are substantially identical in construction and which are supported on frame 22 of vehicle 20. While not necessary to the practice of the invention, the rear cradle 110 is preferably supported on a trailer 112 which is attached through a hitch 114 on the rear end of vehicle 20. However, if desired, such cradle structure 110 could also be supported on a fixed extension extending rearwardly from main frame 22 to define a subframe for one of the two cradle structures.

Each of the cradle structures 110 is substantially identical in cross section and is illustrated in detail in FIGS. 10 and 11. As illustrated in FIGS. 10 and 11, each cradle 110 consists of a substantially C-shaped or U-shaped rigid cradle member 120 that defines an open top for receiving a tree. Member 120 is pivotally supported on frame 22 through a support member 122 which is pivoted through a bracket structure 124 and a pin 126 on frame 22. Cradle member 120 has a bracket structure 128 which is pivoted on support member 122 through a pin 130. A first fluid ram 132 is interposed between frame 22 and support member 122 while a second fluid ram 134 is interposed between support member 122 and cradle member 120.

With this arrangement, actuation of fluid ram 134 will cause cradle member 120 to pivot towards the right side from the position illustrated in solid-lines in FIG. 10 to that illustrated in dotted-lines in FIG. 10 to dump the accumulated trees on the right side of the vehicle. Alternatively, actuation of fluid ram 132 will cause support member 122 and cradle member 120 to pivot in the opposite direction as a unit and to dump the trees on the left side of the vehicle as viewed in the direction of travel thereof. One of the significant advantages of the accumulator mechanism illustrated in FIGS. 9-11 is that the accumulated trees can be dumped while the vehicle is in motion thereby further increasing the productivity of the unit when compared to a unit wherein the accumulator is associated with the cutter mechanism which requires that the cutter mechanism be manipulated to an appropriate position which of necessity must interrupt the tree cutting operation.

A still slightly further modified form of the invention is illustrated in FIGS. 12 and 13 wherein the cutting apparatus is positioned on the vehicle so as to be transversely offset from the longitudinal center line of the vehicle and wherein the open pocket for a tree is defined adjacent one side of the vehicle. In this embodiment of the invention, first and second arm means 140 and 142 have one end pivotally supported on a subframe 144 through pivot pins 146 and 148. The free ends of the first and second arm means are pivotally interconnected through a link 150 which is connected to the respective arm means through pins 152 and 154 which are spaced from each other on link 150. First arm means 140 and link 150 have integral extensions 160 and 162 which cooperate to define an open tree receiving pocket 164 when are means 140 and 142 are in the first position illustrated in FIG. 12. As in the embodiment illustrated in FIGS. 6 and 7, a single cutter blade 166 is fixedly secured to interconnecting or rigid link 150 within pocket 164. Although not shown, a cutter blade could also be fixedly secured to extension 160. A fluid ram 170 is interposed between subframe 144 and first arm means 140 which again is utilized for normally maintaining the cutter mechanism in the first position illustrated in FIG. 12 and will act as a power assist to move the cutter mechanism to the second closed position illustrated in FIG. 13 to sever the standing tree.

The operation of this embodiment of the invention is substantially identical to that described in connection with FIGS. 6 and 7 as well as FIGS. 3 and 4 and need not be repeated here. It will also be appreciated that the power assist fluid ram means 170 could be replaced with a spring means that would normally bias the arms to the position illustrated in FIG. 12 in which case the entire force for severing the tree would come from movement of the vehicle 20 through the propulsion means along the ground.

Summarizing the present invention, in all embodiments thereof, increased productivity is obtained by allowing the operator to continuously move the vehicle along the ground without interruption and constantly sever trees during the movement thereof. Furthermore, when utilizing the specific accumulator mechanism illustrated in FIGS. 9-11, the vehicle can continue to remain in motion while the accumulated trees are being dumped onto the ground for subsequent pickup by a transport vehicle.

What is claimed is:

1. Tree harvesting apparatus, comprising: a vehicle having a frame and propulsion means for moving said frame; first arm means and second arm means fixedly pivotable on said frame, said first arm means and said second arm means each including at least one pair of links pivotally joined together, each pair of links including a first link pivoted on said frame adjacent one end thereof and a second link having one end pivoted on the free end of said first link, with a further link interconnecting said free ends of said second links, said first and second links pivoting between first and second positions; means, connected to said first links, for normally maintaining said first and second link in said first position, said links when in said first position defining an open pocket for receiving a standing tree; and cutter means, on said first and second arm means and contiguous to said pocket, for severing said standing tree, said propulsion means being used to drive said first arm means and said second arm means into said tree, the force of engagement causes said first and second links to pivot to said second position driving said cutter means into said tree and severing the tree at its base.

2. Tree harvesting apparatus, comprising: a vehicle having a frame and propulsion means for moving said frame; first arm means and second arm means fixedly pivotable on said frame, said first arm means and said second arm means each including at least one pair of links pivotally joined together, each pair of links including a first link pivoted on said frame adjacent one end thereof and a second link having one end pivoted on the free end of said first link, with a further link interconnecting said free ends of said second links, said first and said second links pivoting between first and second positions; means, connected to said first links, for normally maintaining said first and second links in said first position, said second links and said further link cooperating to define an open pocket for receiving a standing tree when said first and second links are in said first position; and cutter means, supported on at least one of said second and further links, for severing said standing tree, said propulsion means being used to drive said first arm means and said second arm means into said tree, the force of engagement causes said first and second links to pivot to said second position driving said cutter means into said tree and severing the tree at its base.

3. Tree harvesting apparatus, comprising: a vehicle having a frame and propulsion means for moving said frame; first arm means and second arm means fixedly pivotable on said frame, said first arm means and said second arm means each including at least one pair of links pivotally joined together, each pair of links including a first link pivoted on said frame adjacent one end thereof and a second link having one end pivoted on the free end of said first link, with a further link interconnecting said free ends of said second links, said first and said second links pivoting between first and second positions; means, connected to said first links, for normally maintaining said first and second links in said first position, said second links and said further link cooperating to define an open pocket for receiving a standing tree when said first and second links are in said first position; and cutter means, on said first and second arm means and contiguous to said pocket, for severing said standing tree, said cutter means including a cutter blade fixed to said further link, said propulsion means being used to drive said first arm means and said second arm means into said tree, the force of engagement causes said first and second links to pivot to said second position driving said cutter means into said tree and severing the tree at its base.

4. Tree harvesting apparatus, comprising: a vehicle having a frame and propulsion means for moving said frame; first arm means and second arm means fixedly pivotable on said frame, said first arm means and said second arm means each including at least one pair of links pivotally joined together, each pair of links including a first link pivoted on said frame adjacent one end thereof and a second link having one end pivoted on the free end of said first link, with a further link interconnecting said free ends of said second links, said first and second links pivoting between first and second positions; means, connected to said first links, for normally maintaining said first and second links in said first position, said links in said first position defining an open pocket for receiving a standing tree; and cutter means, on said first and second arm means and contiguous to said pocket, for severing said standing tree, said cutter means including first and second cutter blades respectfully fixed to inner edges of said second links, said propulsion means being used to drive said first arm means and said second arm means into said tree, the force of engagement causes said first and second links to pivot to said second position driving said cutter means into said tree and severing the tree at its base.

5. Tree harvesting apparatus, comprising: a vehicle having a frame and propulsion means for moving said frame; first arm means and second arm means fixedly pivotable on said frame, said first arm means and said second arm means each including a first rigid arm member having one end pivoted on said frame, a second rigid arm member having one end pivoted on said frame, and a rigid link pivotally interconnecting the free ends of said arm members, said link cooperating with at least one of said rigid arm members to define an open pocket for receiving a standing tree, said first arm means and said second arm means pivoting between first and second positions; means, connected to said first arm means and said second arm means, for normally maintaining said first arm means and said second arm means in said first position, said pocket being open with said links in said first position; and cutter means, supported on said rigid link, for severing said standing tree, said propulsion means being used to drive said first arm means and said second arm means into said tree, the force of engagement causes said first arm means and said second arm means to pivot to said second position to drive said cutter means into said tree and severing the tree at its base.

6. Tree harvesting apparatus, comprising: a vehicle having a frame and propulsion means for moving said frame, said frame including a trailer; first arm means and second arm means fixedly pivotable on said frame, said first arm means and said second arm means each including at least one pair of links pivotally joined together, said first arm means and said second arm means pivoting between first and second positions; means, connected to said first arm means and said second arm means, for normally maintaining said first arm means and said second arm means in said first position, said links in said first position defining an open pocket for receiving a standing tree; cutter means, on said first and second arm means and contiguous to said pocket, for severing said standing tree, said propulsion means being used to drive said first arm means and said second arm means into said tree, the force of engagement causes said first arm means and said second arm means to pivot to said second position driving said cutter means into said tree and severing the tree at its base; and first and second accumulator means, on said frame and spaced apart from one another, for collecting said severed tree, with said second accumulator means pivoted on said trailer, the forward motion of said vehicle inducing said severed tree to fall in a direction generally parallel to the direction of motion of said vehicle and into said first and second accumulator means.

7. Tree harvesting apparatus including an elongated vehicle having an elongated frame with cutter means, secured to one end of said frame, for severing a standing tree by driving said vehicle towards said tree and tree accumulator means, said tree accumulator means including: a first transversely extending open top cradle pivoted on said frame; a second transversely extending open top cradle pivoted on said frame at a location spaced from said first cradle; and means for pivoting said cradles to tilt said cradles toward either side of said frame whereby said severed tree is induced to fall upon said accumulator means by the forward motion of said vehicle and said accumulated severed trees may be discharged to either side of said vehicle.

8. Tree harvesting apparatus as defined in claim 7, further including first and second support members respectively interposed between said frame and the respective cradles, each support member being pivotally supported on said frame and each cradle being pivotally supported on a support member and in which said means for pivoting includes first means for pivoting said cradles on said support members to tilt said cradles toward one side of said frame and second means for pivoting said cradles and support members as units to tilt said cradles toward the other side of said vehicle.

9. Tree harvesting apparatus as defined in claim 8, in which said frame includes a main frame with said first cradle supported on said main frame and a trailer with said second cradle pivoted on said trailer.

* * * * *